May 16, 1967 H. H. WIEDER 3,320,554
CYLINDRICAL FILM FERROMAGNETIC RESONANCE DEVICES
Filed Dec. 3, 1964 3 Sheets-Sheet 1

HARRY H. WIEDER
INVENTOR.

BY *J. M. St. Amand*

ATTORNEY

May 16, 1967     H. H. WIEDER     3,320,554
CYLINDRICAL FILM FERROMAGNETIC RESONANCE DEVICES
Filed Dec. 3, 1964     3 Sheets-Sheet 2

HARRY H. WIEDER
*INVENTOR.*

BY *J. M. St. Amand*

ATTORNEY

HARRY H. WIEDER
INVENTOR.

BY J. M. St. Amand

ATTORNEY

United States Patent Office 3,320,554
Patented May 16, 1967

3,320,554
CYLINDRICAL FILM FERROMAGNETIC
RESONANCE DEVICES
Harry H. Wieder, Riverside, Calif., assignor to the United States of America as represented by the Secretary of the Navy
Filed Dec. 3, 1964, Ser. No. 415,832
7 Claims. (Cl. 333—24.1)

The invention herein described may be manufactured and used by or for the Government of the United States of America for governmental purposes without the payment of any royalties thereon or therefor.

The present invention is concerned with ferromagnetic resonance in electroplated or evaporated thin films of ferromagnetic metals, their alloys or oxides. More particularly, this invention relates to cylindrical thin films and their application to such devices as isolators, phase-shifters, filters, modulators, attenuators, directional couplers and the like. Such thin films may be deposited on a center core which can be a copper wire or similar conductor of electricity, or alternatively, on a hollow glass cylinder having a conductive outer coating.

There is some information available on the behavior and properties of plane ferromagnetic films vacuum deposited upon glass substrates. However, there has been no previous work concerning ferromagnetic resonance phenomena in ferromagnetic films having cylindrical symmetry.

It is an object of the present invention to provide a cylindrical thin film ferromagnetic resonance device.

Another object of the invention is to provide ferromagnetic resonance devices at microwave frequencies using cylindrical thin films.

A further object of the invention is to provide cylindrical symmetry thin-film reciprocal and nonreciprocal devices.

Other objects and many of the attendant advantages of this invention will become readily appreciated as the same becomes better understood by reference to the following detailed description when considered in connection with the accompanying drawings wherein.

Figure 1:
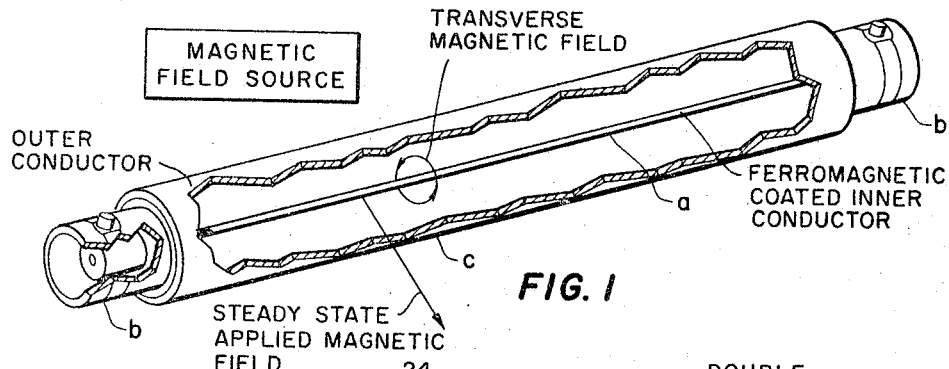
FIG. 1 shows one embodiment of a coaxial cavity with inner conductor with a ferromagnetic film thereon, an outer conductor and coaxial connectors at each end.

This invention is concerned with the utilization of ferromagnetic resonance effects in thin films of ferromagnetic metals, their alloys or oxides. It is concerned specifically with electroplated or vacuum deposited films having a cylindrical configuration surrounding a center core which may be a copper wire or similar conductor of electricity.

The method of preparation and the application of such films to digital computer memory and information processing systems have been described in the literature.

No previous work has been reported, however, concerning ferromagnetic resonance phenomena in ferromagnetic films having cylindrical symmetry. On the other hand, a considerable amount of information is available on the behavior and properties of plane ferromagnetic films vacuum deposited upon glass substrates.

Ferromagnetic resonance of an electron spin system may be represented by the precession of the electron spin axis about an effective steady-state magnetic field. The effective field contains vector components which consist of any externally applied fields, internal magneto crystalline anisotropy fields, and demagnetizing fields which may be related to specimen shape as well as domain structure. The interaction of the precessing electrons with other forces such as introduced by the crystal lattice, lead to a damping out of the precessive motion and this damping process is characterized by a specific relaxation time.

If an external, alternating electro-magnetic field is applied to the spin system in a direction normal to the precession axis, then energy absorbed by the spin system will maintain it in continuous uniform precession provided that the frequency of the transverse electromagnetic field and the precession frequency are identical.

Ferromagnetic resonance in flat thin films is expressed by Kittel, Phys. Rev. 73, 155 (1948), "On the Theory of Ferromagnetic Resonance Absorption," in the equation:

$$f=(\gamma/2\pi)[B_s(H_k \pm H)]^{\frac{1}{2}} \qquad (1)$$

for a film having a uniaxial anisotropy and with the magnetic induction $B_s$ saturated and oriented along the film easy axis in parallel with the D.C. applied magnetic field H. The anisotropy field $H_k$ may be either parallel or antiparallel to H, $\gamma$ is the magnetomechanical ratio and $f$ is the precession frequency. Evidently the lowest resonant frequency for this mode is $f_0=(\gamma/2\pi)(B_sH_k)^{\frac{1}{2}}$ in the absence of any externally applied field. The resonant frequency $f$ varies as the square root of the applied field H. Equation 1 is based also on the fact that the demagnetizing factor normal to the film is $4\pi$ and essentially zero in the plane of the film.

Ferromagnetic resonance has not been observed experimentally on cylindrical films prior to the instant invention, where ferromagnetic resonance in electroplated ferromagnetic films of 80% Ni and 20% Fe alloys has been observed and experimentally induced. Furthermore, it has been found that cylindrical films, even though deposited on a metallic rather than a glass substrate, have small R.F. losses in the UHF and VHF regions of the electromagnetic spectrum. Equation 1 is obeyed completely by such cylindrical films, hence their demagnetization factor, $4\pi$, is identical to that of flat (plane) vacuum-deposited films on glass substrates.

The demagnetization factor is important since the nature of ferromagnetic resonance is altered by the demagnetization factor of a specimen. For example, a ferromagnetic needle of infinitesimal radius has a demagnetizing factor of zero along its axis and $2\pi$ along its transverse radial directions. The aforementioned reference to Kittel has shown that in such a case, the resonance frequency is given by:

$$f=(\gamma/2\pi)[H \pm H_k + 2\pi M_s] \qquad (2)$$

consequently, the resonance frequency $f$ varies linearly with H also for $2\pi M_s \gg H$, the frequency of resonance would be primarily determined by $f \cong \gamma M_s$.

In contrast, for a plane ferromagnetic film, Equation 1 applies, the resonance frequency is approximately proportional to the square root of the magnetic induction and the same conditions apply for cylindrical films with some special advantages due to their geometry.

The demagnetization factor of a cylindrical film may be considered qualitatively as follows: Let a cylindrical film be represented by a cylindrical shell. If the diameter of such a shell is large with respect to its thickness, then its demagnetization factor might be zero in the plane of the film and $4\pi$ normal to the film, consequently the same relation would apply to cylindrical films as those for plane films and Equation 1 would thus apply. Ferromagnetic materials such as iron, nickel, cobalt, gadolinium and their alloys can be used for the cylindrical film.

Figure 2:
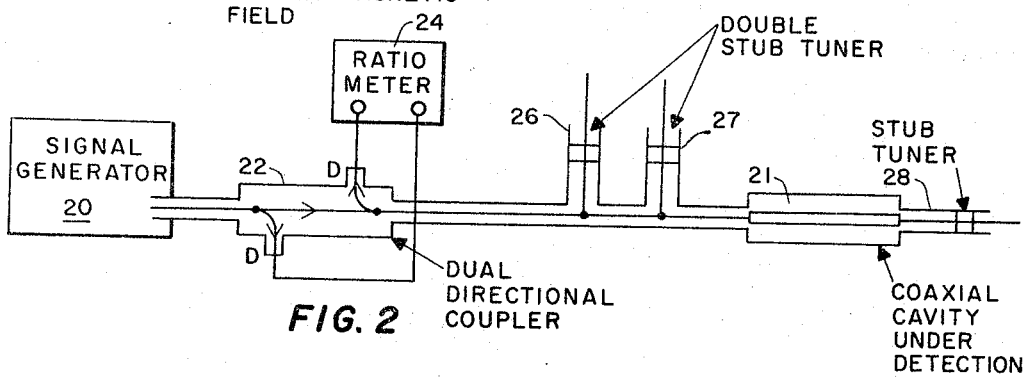
FIG. 2 is a block diagram of apparatus used for investigating ferromagnetic response in cylindrical permalloy films.

Experimental observation of ferromagnetic resonance in permalloy plated wires have been obtained by making them the center conductors of resonant coaxial cavities. Such coaxial cavities were constructed as shown in FIG. 1; the inner conductor $a$, is a beryllium-copper wire $2.54 \times 10^{-2}$ cm. in diameter upon which is plated an alloy of 80–20 FeNi to a thickness of $10^4$ A. It is connected to the center conductor of a coaxial connector, $b$, and is coaxial within the cylindrical outer conductor $c$. FIG. 2 shows schematically a method for detecting ferromagnetic resonance in such a cavity.

A signal generator 20 provides the radio frequency field which sets up a TEM wave in the cavity 21. It covered the range from 450 megacycles to 2000 megacycles and was modulated with a 1 kc. sinusoidal signal.

The output detected at the dual directional coupler 22 by the diode rectifiers D is applied to the ratio detector or meter 24 which then yields the relative ratio of reflected power to incident power, i.e. the resonance condition of the coaxial cavity 21.

Figure 3A:
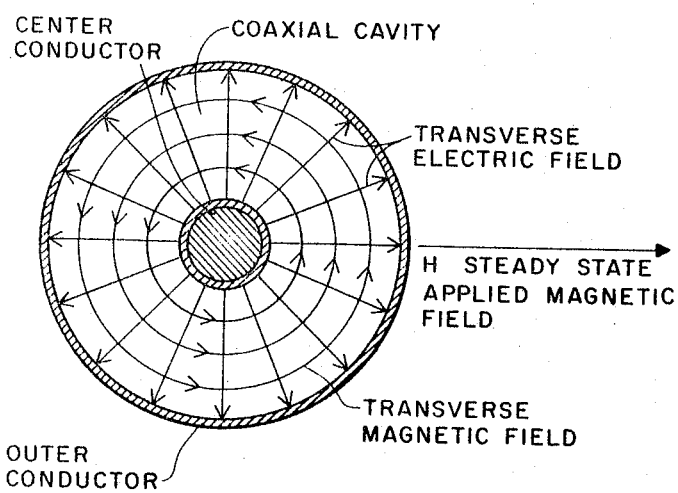
FIG. 3a is a cross section of a coaxial cavity showing magnetic field distribution within the cavity.
Figure 3B:
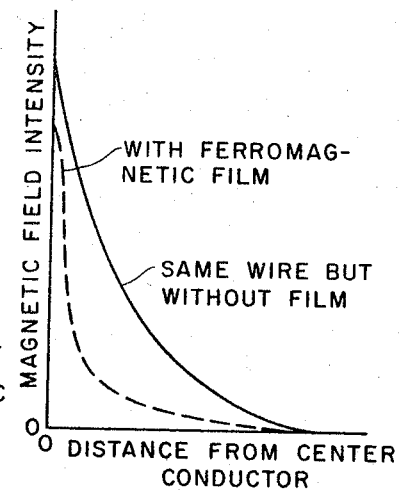
FIG. 3b shows the transverse R.F. distribution of magnetic field component inside the coaxial cavity with and without the magnetic coating on the central conductor.
Figure 4:
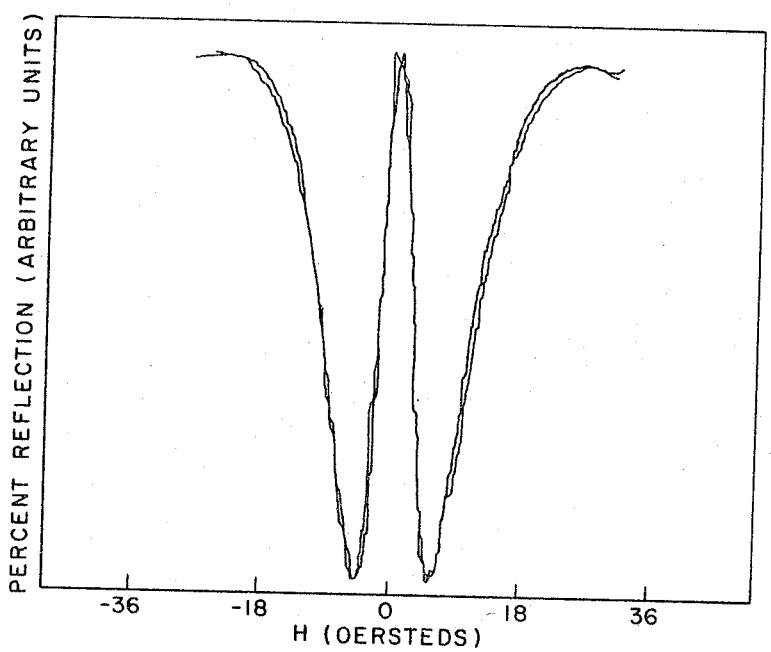
FIG. 4 shows a typical resonance curve.

Stub tuners 26, 27 and 28 were used to first tune the entire assembly to resonance indicated by a minimum in the output of ratio meter 24. Thereafter, a steady state magnetic field was applied in a transverse direction to the R.F. magnetic field as shown in FIGS. 3a and b. This detunes the system in accordance with Equation 1 and resonance will occur at another frequency determined by the magnitude of the steady state field H. Upon sweeping H by altering the current to a Helmholtz coil system in which the coaxial cavity is placed, a typical resonance curve such as shown in FIG. 4 is obtained. The abscissa, proportional to H, is the output potential of a Hall generator (fed from a constant current source and placed within Helmholtz coils) while the ordinate is the corresponding recorded output signal of the ratio detector. The Helmholtz coil was oriented perpendicular to the horizontal component of the earth's local magnetic field, but no other provisions were made for cancelling the earth's field.

FIG. 4 may be understood on the basis of the following explanation: starting with $H=0$, the system is not in resonance because of the relatively large output from the ratiometer. The frequency of the signal generator is maintained constant while the D.C. magnetic field of the Helmholtz coil is slowly driven towards positive values of H. Clearly, the percent reflection decreases as the resonance sets in, as shown in FIG. 4. The condition is determined from Equation 1 of $$f = (\gamma/2\pi)[B_s(H_k \pm H)]^{\frac{1}{2}}$$

FIG. 4 may be understood in terms of similar results on flat films obtained by Toombs and Tasty, Proc. IRE, 50, 1526 (1962), "A Resonance Technique for Nondestructive Read-Out of Thin Magnetic Films." Starting with the magnetization completely saturated at a high applied field, the ratio of reflected to incident power decreases, goes through a minimum at a particular field H and then increases continuing smoothly through $H=0$ and through negative H. As $-H=H_c$, the coercive field of the film, the remanent magnetization switches to its opposite polarity giving rise to a small sharp step. Thereafter, the curve is the replica of the opposite polarity resonance curve.

Figure 5:
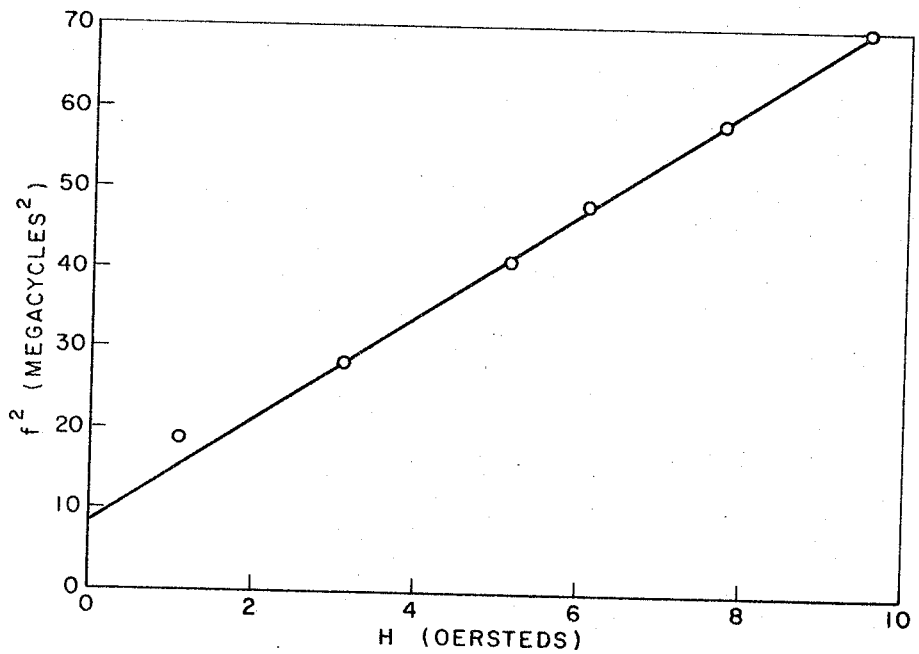
FIG. 5 shows the square of resonance frequency $f^2$ vs. magnetic field at resonance H.

FIG. 5 shows the dependence of $f^2$ vs. H determined from curves such as shown in FIG. 4. Since Equation 1 may be written as:

$$f = k(H + H_k)$$

where $k = B_s(\gamma/2\pi)^2$ hence for $H=0$, $f_0^2 = kH_k$. Since $f_0 \cong 3 \times 10^2$ megacycles; $\gamma/2\pi \cong 2.8$ megacycles/oersted and the saturation induction for a permalloy of 20% iron in nickel is $B_s \cong 10.5 \times 10^4$ it follows that $H_k \cong 1.1$ oersteds. By means of FIG. 5 and similar plots (not shown) taken between $9.5 \times 10^2$ megacycles and $2 \times 10^3$ megacycles, it has been ascertained that Equation 1 is obeyed in the UHF and VHF regions to within the error of measurement.

The following conclusions have been drawn from these experiments:

(1) The fact that the ferromagnetic resonance frequency varies as the square root of H rather than linearly with H supports the assertion that the demagnetizing factor for a cylindrical film is essentially the same as that of a flat film.

(2) The advantages of using cylindrical ferromagnetic films for devices based upon ferromagnetic resonance phenomena lies in the excellent coupling between the alternating high frequency transverse electromagnetic field and the film magnetization in coaxial geometry type devices. The transverse magnetic field component is a maximum at the surface of the inner cylindrical conductor. A comprehensive discusstion of $\mu$-wave, UHF and VHF devices based upon ferromagnetic resonance in ferrites, is found in Proc. IRE, 44, 1229–1516, October (1956), Ferrites issue.

(3) Since the diameter of such a permalloy plated wire is of the order of $2.5 \times 10^{-2}$ cm. and the Q of a coaxial cavity is a maximum for an outer cylinder diameter approximately 3.6 times the diameter of the inner cylinder, ferromagnetic resonance devices such as phase shifters, modulators, etc. can be made to be extremely compact. Other waveguide forms can be used in somewhat similar manner. Rectangular coaxial waveguide also has been used to construct ferromagnetic resonance devices of the instant invention.

(4) The ease and simplicity in obtaining ferromagnetic resonance effects with cylindrical electroplated permalloy films suggest a potential application of other, not necessarily coaxial, structures for reciprocal as well as nonreciprocal devices for the UHF, VHF regions and possibly for $\mu$-wave components as well.

Coaxial nonreciprocal devices

The present invention is concerned with the utilization of ferromagnetic resonance absorption in plated cylindrical wires and cores coated with a magnetic film (e.g. of 80% Ni and 20% Fe alloy $5 \times 10^3$ to $1.5 \times 10^4$ A. in thickness). Practical applications of ferromagnetic resonance are based on the interaction between a transverse electromagnetic field and the induced precession of the magnetic spin system in a ferromagnetic material.

In the case of waveguides, nonreciprocal devices (i.e., isolators, phase-shifters, filters, modulators, attenuators, directional couplers, etc.) based on ferromagnetic resonance absorption employ a transversely magnetized ferrite bar at a location where the longitudinal and transverse magnetic field components are equal and the electromagnetic wave has circular polarization. For one direction of propagation, the spin precession is opposite to the direction of rotation of the circular polarization vector. For waves traveling in the other direction, however, energy from the wave is transferred to the spin system which dissipates it to the crystalline lattice.

For coaxial elements, circular polarization cannot be directly realized since no magnetic field components exist either in the direction of propagation of the TEM wave nor radially between the inner and outer cylinders. If the coaxial line is partly loaded by a dielectric as discussed by Button, J. Appl. Phys. 29, 998 (1958), "Theory of Nonreciprocal Ferrite Phase Shifters in Dielectric Loaded Coaxial Line," the field will be distorted since the electric field in the line will no longer be axially symmetric and in consequence of Maxwell's equation, a longitudinal field in the direction of propagation of the electromagnetic wave comes into being. The magnetic field at the dielectric air interface is very nearly circularly polarized with most of the electromagnetic energy concentrated in the dielectric. If the ferrite is placed at the air-dielectric interface reciprocal phase shifters and nonreciprocal isolators with excellent broad band characteristics can be built.

In order to build a device which has nonreciprocal properties, i.e. a device which has a small attenuation in one direction of propagation and a large attenuation in the opposite direction of propagation of the wave, the coaxial line should have a circular polarization either along the longitudinal ($z$) or transverse ($r$) direction with respect to the direction of propagation. The only magnetic field component of an unloaded coaxial element is $H_o$:

$$H_\theta = \frac{I_0}{2\pi r}(e^{j\omega t - \gamma z} - \rho e^{j\omega t + \gamma z})$$
$$H_r = 0$$
$$H_z = 0$$

where $I_0$ is the conduction current amplitude along the inner conductor, $r$=an arbitrary radius, $\rho$=reflection coefficient, $\gamma$=propagation constant. In order to generate a $z$-sense of circular polarization, it is required than an $H_r$ with an amplitude equal to $H_\theta$ but in phase quadrature with it be produced at a given point.

In a similar fashion an $H_z$ of equal amplitude to $H_\theta$ but in phase quadrature with it generates a circular polarization about $r$. The former was used in the cited reference of Button. The latter, i.e. the circular polarization about $r$, is the subject of this invention.

Figure 6:
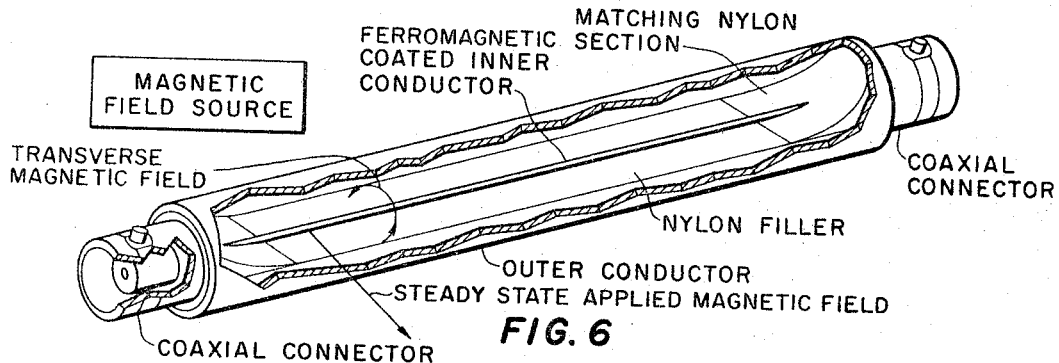
FIG. 6 shows one embodiment of a nonreciprocal device with the coaxial cavity partly loaded with a solid dielectric medium.

FIG. 6 shows one example for construction of a nonreciprocal device using a magnetic film coated wire. A coaxial line was constructed using a cylinder 3" long and 3/8" inner diameter, for example. The cylinder is half-filled with nylon (other suitable loading dielectric can be used) and has a groove at the center. In this groove, the ferromagnetic (FeNi, for example) coated wire is placed and then connected to the coaxial connector. In order to reduce the mis-match between the coupler and other lines, a matching section was introduced. This tapers smoothly from the outer conductor to the inner conductor. The results obtained wtih such a device are shown in FIG. 7.

Figure 7:
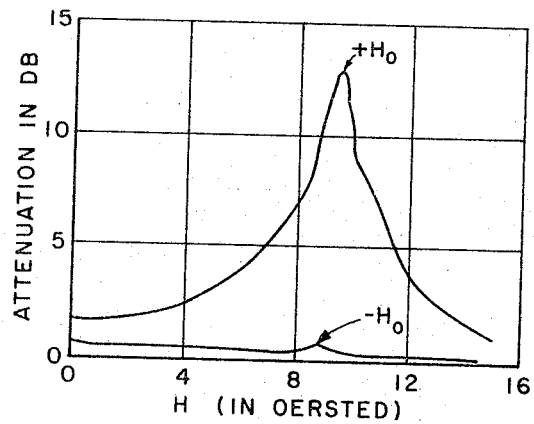
FIG. 7 shows the attenuation as a function of the polarity and amplitude of applied field H for a nonreciprocal device as in FIG. 6.

FIG. 7 shows the attenuation of the transmitted wave as a function of the polarity and the amplitude of the applied field H for a nonreciprocal device built in accordance with the description given in FIG. 6. The frequency of the generator was maintained at $10^3$ megacycles. The occurrence of ferromagnetic resonance $H_0$ for positive and negative fields as shown in FIG. 7 is in fair agreement with calculation derived from Equation 1.

Figures 8, 9:
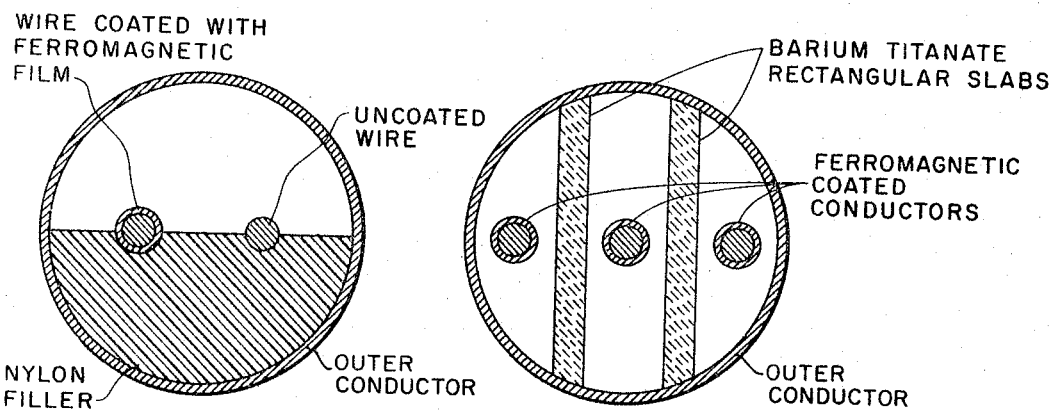
FIG. 8 shows the cross section of a two-wire transmission line having nonreciprocal properties.
FIG. 9 shows in cross section a three-wire transmission line with nonreciprocal properties.

An alternative construction for nonreciprocal devices is shown in FIGS. 8 and 9. Clearly any number of wires might be used provided that they satisfy the required condition of circular polarization far away from the frequency of ferromagnetic resonance. Also, in accordance with the theoretical considerations outlined by Button various materials of dielectric constant and loss may be chosen in any particular frequency region in order to optimize the nonreciprocal properties of such a directional device.

Take $\gamma = ge/2mc$ with $g=2.1$, $m=9.11 \times 10^{-28}$, $e=4.8 \times 10^{-10}$, $c=3 \times 10^{10}$, therefore $\gamma = 1.84 \times 10^7$ and $\gamma/2\pi = 2.929 \times 10^6$ or $\gamma/2\pi \cong 2.93$ megacycles/oersted. For $B_s \cong 1.2 \times 10^4$ gauss and $H_k \cong 2$ oersted.

$$f = 2.93[1.2 \times 10^4(2)]^{1/2} = 2.93 \times 1.55 \times 10^2 \text{ megacycles}$$
$$f = 455 \text{ megacycles for } H = 0$$

Take $H = 10$ oe., then $$f = 2.93[1.2 \times 10^4(10+2)]^{1/2} = 2.93 \times 3.8 \times 10^2 = 11.1 \times 10^2$$
$$f = 1110 \text{ megacycles}$$

Obviously many modifications and variations on the present invention are possible in the light of the above teachings. It is therefore to be understood that within the scope of the appended claims the invention may be practiced otherwise than as specifically described.

What is claimed is:

1. A coaxial ferromagnetic resonance device comprising:
    (a) a cylindrical inner conductor,
    (b) a thin-film of ferromagnetic material on the cylindrical surface of said inner conductor,
    (c) an outer conductor coaxial with said inner conductor and spaced therefrom forming a coaxial cavity therebetween,
    (d) input and output connector means to said inner and outer conductors,
    (e) a uniform applied magnetic field generated from an external source being applied in a direction perpendicular to the longitudinal cylindrical axis of the coaxial conductors and having a magnitude sufficient to excite ferromagnetic resonance in said ferromagnetic thin-film on the surface of said cylindrical inner conductor, and consequently having a large absorption of RF energy corresponding to the ferromagnetic resonance frequency.

2. A device as in claim 1 wherein said ferromagnetic material is chosen from the group consisting of iron, nickel, cobalt, gadolinium, and the alloys of these metals with each other and oxides of these same metals.

3. A device as in claim 1 wherein said uniform applied magnetic field is swept through ferromagnetic resonance thus impressing a modulation upon the coaxial cavity.

4. A device as in claim 1 wherein means for generating a circular polarization in the coaxial cavity is provided for the purpose of making the absorption of RF energy dependent on the direction relative to the cylinder axis and said uniform applied magnetic field is applied radially to said cylindrical ferromagnetic thin-film, thus resulting in a nonreciprocal device.

5. A device as in claim 4 wherein said means for generating a circular polarization is a dielectric medium which partly loads the coaxial cavity.

6. A device as in claim 5 wherein said ferromagnetic material is chosen from the group consisting of iron, nickel, cobalt, gadolinium, and the alloys of these metals with each other and oxides of these same metals.

7. A device as in claim 5 wherein said uniform applied magnetic field is swept through ferromagnetic resonance thus impressing a modulation upon the coaxial cavity.

References Cited by the Examiner

UNITED STATES PATENTS

| | | | |
|---|---|---|---|
| 2,802,183 | 8/1957 | Read | 332—51 |
| 2,989,480 | 6/1961 | Matthias | 117—235 X |
| 3,183,492 | 5/1965 | Chow et al. | 117—235 X |
| 3,221,276 | 11/1965 | Stern | 333—24.2 |

HERMAN KARL SAALBACH, *Primary Examiner.*

ELI LIEBERMAN, *Examiner.*

P. L. GENSLER, *Assistant Examiner.*